United States Patent
Gilli

(10) Patent No.: US 10,482,221 B2
(45) Date of Patent: Nov. 19, 2019

(54) PROTECTING A COMPUTER PROGRAM AGAINST REVERSE ENGINEERING

(71) Applicant: INVENTIO AG, Hergiswil NW (CH)

(72) Inventor: Markus Gilli, Sempach (CH)

(73) Assignee: INVENTIO AG, Hergiswil NW (CH)

( * ) Notice: Subject to any disclaimer, the term of this patent is extended or adjusted under 35 U.S.C. 154(b) by 259 days.

(21) Appl. No.: 15/554,830

(22) PCT Filed: Feb. 22, 2016

(86) PCT No.: PCT/EP2016/053676
§ 371 (c)(1),
(2) Date: Aug. 31, 2017

(87) PCT Pub. No.: WO2016/139078
PCT Pub. Date: Sep. 9, 2016

(65) Prior Publication Data
US 2018/0181729 A1    Jun. 28, 2018

(30) Foreign Application Priority Data
Mar. 2, 2015 (EP) .................................... 15157242

(51) Int. Cl.
*G06F 21/14* (2013.01)
*G06F 21/60* (2013.01)
(Continued)

(52) U.S. Cl.
CPC ............ *G06F 21/14* (2013.01); *G06F 9/4401* (2013.01); *G06F 9/445* (2013.01);
(Continued)

(58) Field of Classification Search
CPC ....... G06F 21/24; G06F 21/125; G06F 9/4555
See application file for complete search history.

(56) References Cited

U.S. PATENT DOCUMENTS 7,841,009 B1   11/2010   Smith
8,892,876 B1   11/2014   Huang et al.
(Continued)

FOREIGN PATENT DOCUMENTS

WO    2006031127 A2    3/2006
WO    2016139078 A1    9/2016

OTHER PUBLICATIONS

JAR2EXE.com v2.1, Dec. 29, 2013.

*Primary Examiner* — Phil K Nguyen
(74) *Attorney, Agent, or Firm* — William J. Clemens; Shumaker,Loop & Kendrick, LLP

(57) ABSTRACT

A method of protecting a computer program against reverse engineering includes: obfuscating and/or encrypting at least one program library of the computer program, wherein the at least one program library contains byte code adapted for being executed by a virtual machine; including the at least one obfuscated and/or encrypted library into a bootstrap library, the bootstrap library including a bootstrap module adapted for loading the at least one program library into the virtual machine and for starting the computer program; encrypting the bootstrap library; and including the encrypted bootstrap library into a native code launcher executable including a launcher module adapted for starting the virtual machine, decrypting the bootstrap library and for loading the bootstrap library into the virtual machine.

13 Claims, 1 Drawing Sheet

(51) Int. Cl.
  *G06F 9/4401*   (2018.01)
  *G06F 21/12*    (2013.01)
  *G06F 9/445*    (2018.01)
  *G06F 9/455*    (2018.01)
  *H04L 9/06*     (2006.01)
  *H04L 9/14*     (2006.01)

(52) U.S. Cl.
  CPC ........ *G06F 9/45558* (2013.01); *G06F 21/125* (2013.01); *G06F 21/602* (2013.01); *H04L 9/065* (2013.01); *H04L 9/14* (2013.01); *G06F 2009/45575* (2013.01); *G06F 2221/0748* (2013.01)

(56) References Cited

U.S. PATENT DOCUMENTS

| | | | | |
|---|---|---|---|---|
| 9,202,053 | B1* | 12/2015 | Huang | G06F 21/566 |
| 2003/0233489 | A1* | 12/2003 | Blaser | G06F 8/61 |
| | | | | 719/328 |
| 2012/0216052 | A1* | 8/2012 | Dunn | G06F 21/78 |
| | | | | 713/193 |
| 2012/0246487 | A1* | 9/2012 | Gu | G06F 21/51 |
| | | | | 713/190 |
| 2013/0117564 | A1* | 5/2013 | Chang | G06F 9/45558 |
| | | | | 713/168 |
| 2015/0006909 | A1 | 1/2015 | Ogawa | |

\* cited by examiner

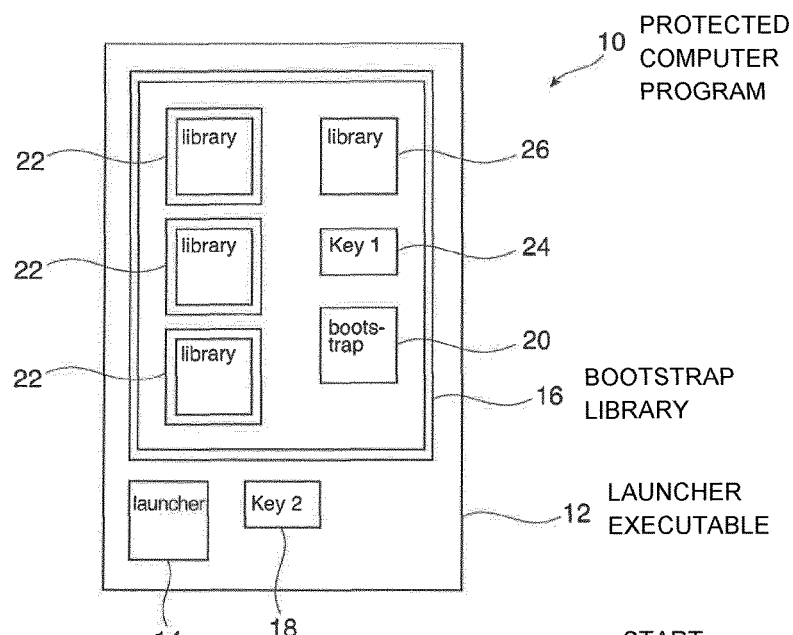
Fig. 1
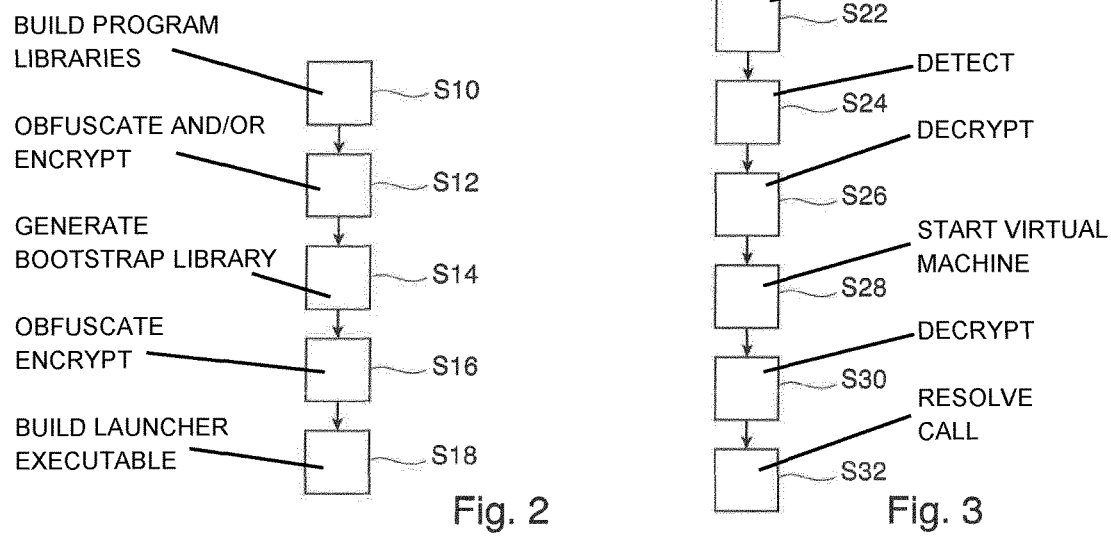
Fig. 2
Fig. 3

PROTECTING A COMPUTER PROGRAM AGAINST REVERSE ENGINEERING

FIELD OF THE INVENTION

The invention relates to a method of protecting a computer program against reverse engineering and to a method of launching a protected computer program. Furthermore, the invention relates to a protected computer program and to a computer-readable medium.

BACKGROUND OF THE INVENTION

The applicant of the present application produces elevators and escalators as well as the corresponding control devices. These control devices are accessed by several applications, which, for example, may be used for displaying the current position of the elevators of a building or for performing diagnostic tasks.

To benefit from the advantages of machine independent code, these applications usually are written in programming languages such as JAVA, C# or Visual Basic, which produces byte code as intermediate language that is translated into native code during runtime. For example, the CADI (Computer Assisted Diagnostic Instrument) application, which is used for performing diagnostic tasks on an elevator, is normally written in C#. The source code is compiled by the .NET CLR (common language runtime) compiler into CIL (Common Intermediary Language). The CIL byte code is used by the CLR runtime, which is loaded when you start a .NET process. The JIT (just-in-time) compiler processes the CIL byte code and transforms it into native code that is processed by the processor of the computer.

Byte code is not protected against reverse engineering. Tools like ILSpy, which makes reverse engineering of .NET applications very easy, are available free and open-source that can manage this. However, from reverse engineered applications, the access codes for the control devices may be retrieved and misused.

A common way to protect C# source code against reverse engineering is obfuscation. Obfuscation renames classes, methods, properties and fields and may introduce false conditional statements and other misleading constructs in order to confuse and break decompiles. Obfuscation may make reading, writing and reverse-engineering of a program difficult and time-consuming, but not necessarily impossible.

WO 2006 031127 A2 relates to methods and arrangements for distributing computer programs and user licenses in a secure manner. Parts of the computer programs may be independently obfuscated or encrypted.

SUMMARY OF THE INVENTION

It is an objective of the invention to protect byte code from reverse engineering.

An aspect of the invention relates to a method of protecting a computer program against reverse engineering. The computer program may be based on byte code and/or may be based on one or more program libraries containing the functions and/or classes of the computer program.

According to an embodiment of invention, the method comprises: obfuscating and/or encrypting at least one program library of the computer program, wherein the at least one program library contains byte code adapted for being executed by a virtual machine; including the at least one obfuscated and/or encrypted library into a bootstrap library, the bootstrap library comprising a bootstrap module adapted for loading the at least one program library into the virtual machine and for starting the computer program; encrypting the bootstrap library; including the encrypted bootstrap library into a native code launcher executable comprising a launcher module adapted for starting the virtual machine, decrypting the bootstrap library and for loading the bootstrap library into the memory of the virtual machine.

Summarized, the one or more library of the computer program may be obfuscated and/or encrypted in two steps and are saved into a launcher executable based on native code. The whole method for protecting the computer program may be performed with a batch file and/or make file automating the obfuscating, encrypting and/or packaging steps.

A file storing a computer program usually comprises two parts. One part stores the code of the computer program (such as byte code or native code). The other part stores data that may be processed by the computer program. Such a file may be called a library or an executable. A library may store code for several functions and/or classes. An executable may be a special library additionally comprising a function that is called, when the executable is loaded into memory and/or into the virtual machine. For example, in C++ or C, the "main"-function is called after the startup of the executable.

For example, for the .NET languages (such as C#, Visual Basic, etc.), libraries comprises CIL byte code and are called assemblies. .NET assemblies may have the file extension ".DLL". Corresponding executables may have the file extension ".EXE". In JAVA, libraries are called packages.

In a first step, the one or more libraries of the computer program to be protected, which contain byte code, are obfuscated and/or encrypted and are placed as data into a further library called bootstrap library. This bootstrap library also comprises a module based on byte code, which comprises functions and/or classes for loading the one or more libraries into the virtual machine and optionally for decrypting them. Furthermore, the main function of the protected computer program may be called by the bootstrap module. The bootstrap module may be a collection of functions and/or classes (bases on byte code) adapted for performing the tasks of the bootstrap module.

In a second step, the bootstrap library may be obfuscated and/or encrypted and is placed as data into a launcher executable, which comprises a launcher module based on native code, which is adapted for decrypting the bootstrap library, for starting the virtual machine and for calling a bootstrap function of the bootstrap module, which starts the tasks of the bootstrap library. The launcher module may be a collection of functions and/or classes (based on native code) adapted for performing the tasks of the bootstrap module.

According to an embodiment of the invention, a first key for decrypting the at least one program library is included into the bootstrap library, wherein the bootstrap module is adapted for decrypting the at least one library with the first key. The first key, which may be a string, an initial vector for the RC4 algorithm or a private certificate (optionally together with a secret), is stored as data in the bootstrap library. The bootstrap module may read the key and may use it to decrypt the program libraries.

According to an embodiment of the invention, a second key for decrypting the bootstrap library is included into the launcher executable. The second key, which may be different from the first key, may be stored as data in the launcher executable. The launcher module may read the second key, which may be a string, an initial vector for the RC4 algorithm or a private certificate (optionally together with a secret), and may use it for decrypting the bootstrap library.

According to an embodiment of the invention, the bootstrap library is obfuscated before it is encrypted. Without obfuscating the bootstrap library, there are the possibilities to obfuscate the program libraries and to encrypt the bootstrap library, to encrypt the program libraries and to encrypt the bootstrap library and to obfuscate and encrypt the program libraries and to encrypt the bootstrap library. With obfuscating the bootstrap library, there are the possibilities to obfuscate the program libraries and to obfuscate and encrypt the bootstrap library, to encrypt the program libraries and to obfuscate and encrypt the bootstrap library and to obfuscate and encrypt the program libraries and to obfuscate and encrypt the bootstrap library.

According to an embodiment of the invention, the at least one program library and/or the bootstrap library is encrypted and decrypted with an RC4 algorithm. RC4 is a stream cipher using an initial vector for encrypting and decrypting a data stream.

According to an embodiment of the invention, a further program library containing byte code is directly (unmodified) included into the bootstrap library. For example, $3^{rd}$ party libraries need not be obfuscated and/or encrypted, since the source code of these libraries anyway may be available and thus computing time for decrypting these libraries may be saved.

According to an embodiment of the invention, the at least one program library, the further program library and/or the bootstrap library contain CIL byte code or JAVA byte code. The protected computer program may be a .NET managed code program (and may be written in C# or Visual Basic) or may be a JAVA program. The bootstrap library may be written in the same language as the program libraries.

A further aspect of the invention relates to a method of launching a protected computer program, which may have been composed by the method for protecting the computer program as described in the above and in the following. While the protected computer program may be generated with a batch file or make file from the program libraries, the method of launching the protected computer program may be performed, when starting the launcher executable.

According to an embodiment of the invention, the method comprises: starting a launcher module of a native code launcher executable, the native code launcher executable containing an encrypted bootstrap library and the encrypted bootstrap library containing at least one obfuscated and/or encrypted program library; starting a virtual machine by the launcher module; decrypting the bootstrap library by the launcher module; loading at least a bootstrap module of the bootstrap library into the virtual machine and starting the bootstrap module by the launcher module; loading a program library stored in the bootstrap library into the virtual machine and starting the program library by the bootstrap module.

Summarized, the launcher executable unpacks and decrypts the bootstrap library, starts the virtual machine and starts the bootstrap module in the virtual machine. The bootstrap module may then unpack and/or decrypt the library containing the main function of the protected computer program, may load this library into the virtual machine and may start the main function.

According to an embodiment of the invention, the method further comprises: decrypting the program library by the bootstrap module. As already described, additionally to being obfuscated, the program library may be decrypted with a first key, while the bootstrap library may be decrypted with a second key.

According to an embodiment of the invention, the method further comprises resolving a call to a further encrypted program library by the bootstrap module by: waiting for the call; decrypting the further program library after the call; loading the further program library into the virtual machine. .NET as well as JAVA comprises an overwritable mechanism for resolving function calls. Whenever the virtual machine does not find a called function, it may hand over control to the bootstrap module which optionally decrypts the program library comprising the called function and loads it into the virtual machine. After that, the virtual machine may call the function. In such a way, only libraries really needed by the computer program are decrypted. Furthermore, computing time may be saved by only decrypting needed program libraries.

According to an embodiment of the invention, the method further comprises detecting, by the launcher module, whether a debugger is active and terminating, when an active debugger is detected. In the case, the launcher module detects a debugger that may be used for reading the bootstrap module and/or the executed program libraries, the operation of the program may be terminated to prevent this reading.

According to an embodiment of the invention, the method further comprises testing, by the launcher module, whether the computer program is allowed to run on a system, which executes the launcher executable and terminating, when the computer program is not allowed to run on the system. For example, the protected computer program may be restricted to a specific real machine such as a specific PC. The launcher module may test, whether it is executed by this PC or not. In the case, it is not running on the correct machine, it will be terminated. This may establish a copy protection for the protected computer program.

Further aspects of the invention relate to a protected computer program and computer-readable medium, in which such a computer program is stored. A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

According to an embodiment of the invention, the computer program comprises a launcher executable containing native code, an encrypted bootstrap library contained in the launcher executable and at least one obfuscated and/or encrypted program library contained in the bootstrap library. When the computer program is started, it is adapted for performing the method of launching a protected computer program as described in the above and in the following. The encrypted bootstrap library, which is based on byte code may be stored as data in the launcher executable, which is based on native code. The native code of the launcher executable may decrypt the bootstrap library and may call a bootstrap function, which starts to access the program libraries in byte code, which are stored as data in the bootstrap library.

According to an embodiment of the invention, the launcher executable is contained in one data file, in which the bootstrap library containing the at least one program library is stored. The launcher executable may be one ".EXE"-file, which contains all the code and all the libraries needed for executing the protected computer program.

These and other aspects of the invention will be apparent from and elucidated with reference to the embodiments described hereinafter.

BRIEF DESCRIPTION OF THE DRAWINGS

Below, embodiments of the present invention are described in more detail with reference to the attached drawings.

FIG. 1 schematically shows a protected computer program according to an embodiment of the invention.

FIG. 2 shows a flow diagram for protecting a computer program according to an embodiment of the invention.

FIG. 3 shows a flow diagram for launching a protected computer program according to an embodiment of the invention.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

FIG. 1 shows a protected computer program 10 which comprises a launcher executable 12 based on native code. The launcher executable 12, which may be directly started without a virtual machine, comprises a launcher module 14 containing executable native code and an encrypted bootstrap library 16. The encrypted bootstrap library 16 may be contained in the launcher executable 12 as data. Furthermore, the launcher executable 12 may contain a key 18 (Key 2) for decrypting the bootstrap library 16.

When the launcher executable 12 is started, a main function in native code in the launcher module 14 is started, which decrypts the bootstrap library 16, starts a virtual machine and loads the decrypted bootstrap library 16 into the virtual machine.

The bootstrap library 16 comprises a bootstrap module 20 in byte code, which may be executed by the virtual machine and one or more encrypted program libraries 22, which are contained in the bootstrap library 16 as data. Furthermore, the bootstrap library 16 may contain a key 24 (Key 1) for decrypting the program libraries 22. Additionally, the bootstrap library 16 also may contain one or more further libraries 26, which are not decrypted. The further library 26 may be contained as data in the bootstrap library 16.

The bootstrap module 20 contains byte code that is executable by the virtual machine and/or may contain functions for decrypting the program libraries 22 and/or loading the program libraries 22, 26 into the virtual machine. Also, the program libraries 22, 26 are based on byte code. The bootstrap module 20 furthermore may be adapted to intercept library resolves of the virtual machine to only decrypt encrypted program libraries 22, when a function inside is called.

For example, the launcher executable 12 may be a Win32 application written in C++, wherein the encrypted bootstrap library 16 is included as a C++ header. The bootstrap library 16 may be a .NET assembly, in which the encrypted program libraries 22, the further program libraries 26 and the key 24 may be embedded resources. Also the program libraries 22, 26 may be .NET assemblies. In this case, the virtual machine may be the .NET runtime, in which the bootstrap library 16 and the program libraries may be loaded and executed.

The program libraries 22 are protected against reverse engineering, since these program libraries 22 and their key 24 are never present unencrypted outside of volatile memory.

Because all the libraries 22 of the computer program 10 may be obfuscated, logger names for a logger (such as NLog, a free logging platform for .NET) may not be readable for all obfuscated classes. This may not affect public classes. To fix this, the logger instance for such classes may be created with an explicit name.

FIG. 2 shows a method for generating the protected computer program 10. The protection of the computer program in the program libraries 22, 26 comprises multiple stages of obfuscation and encryption. All those stages make it harder to create illegal copies of the computer program or reverse engineer its code.

The deploying of the launcher executable 12 may be automated by a batch script (e.g. *.bat or *.cmd file). This batch script may perform all actions needed to build, obfuscate, encrypt and pack all related files. The following method steps all may be performed by this batch script.

In step S10, the program libraries 22 are built from source code. For example, in Visual Studio, the build of the corresponding C# project may be started and the constant "OBFUSCATE" may be passed as argument. This may allow to remove the "InternalsVisibleTo" attribute which may be used by unit test to access internal classes.

In step S12, the generated program libraries 22 are obfuscated and/or encrypted. For example, the configuration of the obfuscation may have "string encryption" enabled. It also may merge the obfuscation code into one shared assembly to increase performance and reduce overhead. The obfuscated program libraries 22 may be encrypted with a private certificate and/or with an RC4 algorithm. The RC4 algorithm may get a random initial vector from the batch script, so every time the computer program is deployed, a different initial vector is used. In the case of a certificate, the key 24 may be the private certificate and the corresponding secret. In the case of RC4, the key 24 may be the random initial vector.

In step S14, the bootstrap library 16 is generated. The bootstrap library 16 may be based on code adapted for decrypting the program libraries 22, for loading the program libraries 22, 26 into the virtual machine and for starting the computer program by calling a starting function or main function in one of the program libraries 22. The code of the bootstrap library 16 compiled into byte code is included as bootstrap module 20 into the bootstrap library 16. The obfuscated and/or encrypted libraries 22 and the key 24 are also included into the bootstrap library 16.

For example, the bootstrap library 16 may be based on a further C# project comprising the source code of the bootstrap module 20. The encrypted program libraries (C# assemblies) 22 are placed in the resource folder of the bootstrap library by using e.g. Visual Studio. Furthermore, the program libraries 26 and the key 24 stored to a file may be placed into the resource folder. For example, the generated initial vector from the previous step will be added to the project as a generated C# file.

The project file of the bootstrap library 16 may contain a wildcard include of all files in the resource folder. So all encrypted program libraries 22, the program libraries 26 and the key 24 may be embedded into the bootstrap library 16 as embedded resources.

In step S16, the bootstrap library 16 is optionally obfuscated and after that encrypted. Since the bootstrap module 20 contains byte code and contains the decryption algorithm and the bootstrap library contains the key 24, the library 16 is optionally obfuscated and encrypted after the build has finished.

The bootstrap library 16 may be encrypted using a certificate or the RC4 algorithm. The initial vector for the RC4 encryption may be randomly generated and may be different for each build. In the case of a certificate, the key 18 may be the private certificate and the corresponding secret. In the case of RC4, the key 18 may be the random initial vector. The key 18 of the bootstrap library 16 may be different from the key 24.

For both the encryption of the program libraries 22 and the bootstrap library 16, an RC4 algorithm—the most widely used software stream cipher—may be used. The initial vectors (i.e. keys 18, 24) for RC4 may be generated every time the program libraries 22 and the bootstrap library 16 are built and therefore will be different for each release of the computer program 10.

In step S18, the launcher executable 12 is built. The launcher executable 12 comprises a launcher module 14 based on native code and adapted for starting the virtual machine, decrypting the bootstrap library 16 and for loading the bootstrap library 16 into the virtual machine. The encrypted bootstrap library 16 and the key 18 are included into the launcher executable 12.

For example, the launcher executable 12 may be based on a Win32/C++ project that loads the .NET engine and launches the bootstrap. The encrypted bootstrap library 16 may be stored in a C++ header file, which contains a byte array with the encrypted content of the bootstrap library 16. This file may be placed into the launcher project and/or may be compiled to native code together with the other sources of the launcher executable 12. Also the key 18, for example the generated initial vector for RC4, may be included in this build. The final launcher executable 12 may contain the encrypted and obfuscated version of the bootstrap library 16.

The result may be a packed, two times encrypted and two times obfuscated computer program that is started via Windows. When the launcher executable 12 is started, the .NET engine may execute the bootstrap library 16 which may resolve, decrypt and execute the original program libraries 22. The program libraries 22 of the computer program 10 are never unencrypted available on the file system. All program libraries 22, 26 of the computer program 10 may be bundled together (for example, only one *.exe file is to be delivered).

FIG. 3 shows a method for launching the protected computer program 10.

In step S20, the launcher module 14 is started. For example, the launcher executable 12 may be a native code Windows executable and after its start, a main function in the launcher module 14 is called. Because the computer program 10 is executed via the launcher executable, which is a native code library, there is no entry point for a byte code library, such as an entry assembly of a .NET program.

In step S22, the launcher module 14 tests, whether the computer program is allowed to run on the system, which executes the launcher executable. For example, the system may be a PC and/or the launcher module 20 may use an X509 certificate to verify if it is allowed to run on the current computer. Those certificates may contain unique hardware identifications and the user who requested the certificates. If someone is able to create illegal copies of the computer program 10, the certificate, which also may be included into the launcher executable 12, may possibly get information about who provided the original software.

If the computer program 10 is not allowed to run on the system, the launcher executable 12 is terminated.

In step S24, the launcher module 14 detects, whether a debugger is active. This may be performed by an integrity checker, which may be a task running in the launcher executable 12 that checks the application integrity. This task may detect debuggers or manipulation of the activation. However, for the protected computer program 10, debugging is nearly impossible. The classes may be obfuscated and not available except in memory. The stack trace may give some information about an exception but it will still be difficult to understand.

If an active debugger is detected, the launcher executable and/or a started virtual machine is terminated.

In step S26, the bootstrap library is decrypted by the launcher module 14. For example, the bootstrap library 16 is decrypted with an RC4 algorithm implemented in native code in the launcher module 14.

In step S28, a virtual machine is started by the launcher module 14. For example, the launcher module 14 may start the .NET runtime. After that, the bootstrap library 16 is loaded into the virtual machine and an entry point, for example a main function, is called by the launcher module 14. Thus, the bootstrap module 20 is started and is executed in the virtual machine.

In step S30, the bootstrap module 20 decrypts the program library 22 containing an entry point, for example a main function, to the protected computer program 10. For example, in .NET this may be a managed ".EXE"-file. The decrypted program library 22 is loaded into the virtual machine and the entry point is called by the bootstrap module 14. Thus, the protected code of the computer program 10 is launched.

It is not necessary to decrypt the libraries 22 of the computer program 10, when their functions are not called. The decryption of the libraries may be controlled by function call resolve.

In step S32, a call to a further encrypted program library 22 is resolved by the bootstrap module 20. For example, the bootstrap module 20 has registered a callback of the virtual machine, which is called, when a function name cannot be resolved. With this callback, the bootstrap module 20 waits for a call for an unresolved function. When the callback is called, the bootstrap module 20 decrypts the program library 22, containing the function to be called and loads it into the virtual machine.

For example, the .NET framework allows intercepting the assembly resolve and loading them in a custom way. This can be used to load assemblies from encrypted source, e.g. binary files or embedded resources. When this technique is used, the CIL of the assemblies is only available unencrypted in memory. There will never be an unencrypted file available for decompiles.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage.

The invention claimed is:

1. A method of protecting a computer program against reverse engineering, the method comprising the steps of:
    at least one of obfuscating and encrypting at least one program library of the computer program, wherein the at least one program library contains byte code adapted for being executed by a virtual machine;
    including the at least one program library into a bootstrap library, the bootstrap library including a bootstrap module adapted for loading the at least one program library into the virtual machine and for starting the computer program;
    encrypting the bootstrap library;
    including the encrypted bootstrap library into a native code launcher executable including a launcher module adapted for starting the virtual machine,
    decrypting the bootstrap library and for loading the bootstrap library into the virtual machine;
    wherein the bootstrap library included a first key for decrypting the at least one program library and wherein the bootstrap module is adapted for decrypting the at least one program library with the first key.

2. The method according to claim 1 wherein a second key for decrypting the bootstrap library is included into the launcher executable and wherein the launcher executable is adapted for decrypting the bootstrap library with the second key.

3. The method according to claim 1 wherein a key for decrypting the bootstrap library is included into the launcher executable and wherein the launcher executable is adapted for decrypting the bootstrap library with the key.

4. The method according to claim 1 wherein the bootstrap library is obfuscated before being encrypted.

5. The method according to claim 1 wherein at least one of the at least one program library and the bootstrap library is encrypted and decrypted with an RC4 algorithm.

6. The method according to claim 1 wherein a further program library containing byte code is directly included into the bootstrap library.

7. The method according to claim 1 wherein at least one of the at least one program library and the bootstrap library contains CIL byte code or JAVA byte code.

8. A method of launching a protected computer program comprising the steps of:
    starting a launcher module of a native code launcher executable, the native code launcher executable containing an encrypted bootstrap library, the encrypted bootstrap library containing at least one program library being at least one of obfuscated and encrypted;
    starting a virtual machine with the launcher module;
    decrypting the bootstrap library with the launcher module; loading a bootstrap module of the bootstrap library into the virtual machine and starting the bootstrap module with the launcher module; and
    loading a program library contained in the bootstrap library into the virtual machine and starting the program library with the bootstrap module;
    resolving a call to an encrypted further program library by the bootstrap module by:
    waiting for the call;
    decrypting the further program library after the call; and
    loading the further program library into the virtual machine.

9. The method according to claim 8 further comprising decrypting the program library with the bootstrap module.

10. The method according to claim 8 further comprising: detecting, by the launcher module, whether a debugger is active; and terminating the launching when an active debugger is detected.

11. The method according to claim 8 further comprising: testing, with the launcher module, whether the computer program is allowed to run on a system that executes the launcher executable; and terminating when the computer program is not allowed to run on the system.

12. A computer program product comprises a non-transitory computer readable medium stored instructions that when executed by a processor, cause the processor to perform the steps of:
    starting a launcher module of a native code launcher executable,
    the native code launcher executable containing an encrypted bootstrap library,
    the encrypted bootstrap library containing at least one program library being at least one of obfuscated and encrypted;
    starting a virtual machine with the launcher module;
    decrypting the bootstrap library with the launcher module;
    loading a bootstrap module of the bootstrap library into the virtual machine and starting the bootstrap module with the launcher module; and
    loading a program library contained in the bootstrap library into the virtual
    machine and starting the program library with the bootstrap module;
    wherein the native code launcher executable containing native code;
    wherein the encrypted bootstrap library contained in the launcher executable; and
    at least one program library being at least one of obfuscated and encrypted contained in the bootstrap library.

13. The computer program product according to claim 12 wherein the launcher executable is contained in one data file, and the bootstrap library containing the at least one program library is stored in the one data file.

* * * * *